April 12, 1932.     O. MYKLEBY     1,853,448
PORTABLE BATTERY CELL PULLER
Filed Sept. 5, 1930
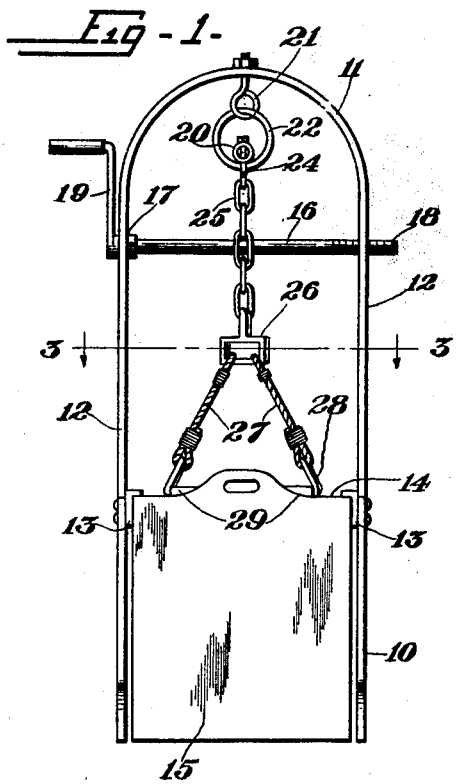
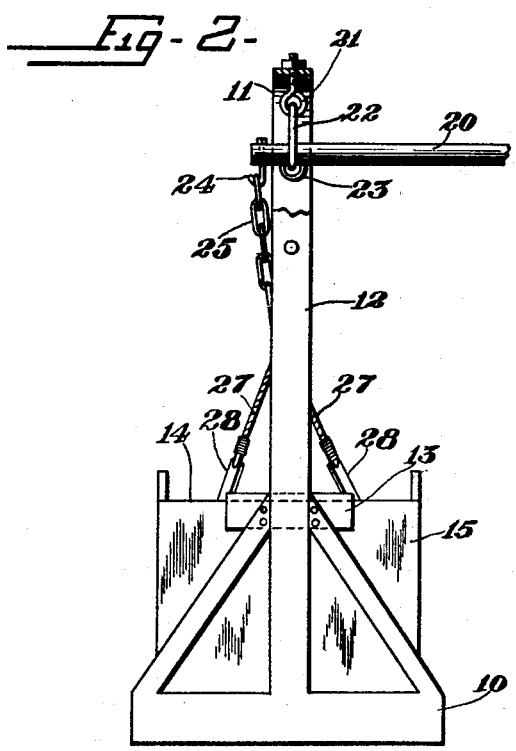
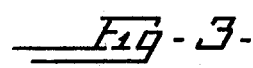
Olaf Mykleby, INVENTOR
BY Victor J. Evans, ATTORNEY Patented Apr. 12, 1932

1,853,448

UNITED STATES PATENT OFFICE

OLAF MYKLEBY, OF ABERDEEN, SOUTH DAKOTA

PORTABLE BATTERY CELL PULLER

Application filed September 5, 1930. Serial No. 479,994.

This invention relates to devices for pulling the cells from the casings of storage batteries, an object being to provide means which may be adjusted to accommodate batteries of different sizes and engaged with the cells thereof and operated to pull the cells from the battery case.

Another object of the invention is the provision of a battery cell puller which is simple in construction, efficient in use, and by means of which the cells may be pulled from the case of a storage battery in a relatively short time and with a minimum amount of labor.

With the above and other objects in view, the invention further includes the following novel features and details of construction, to be hereinafter more fully described, illustrated in the accompanying drawings and pointed out in the appended claims.

In the drawings:—

Figure 1 is an elevation illustrating the use of the invention.

Figure 2 is an elevation at right angles to Figure 1.

Figure 3 is a section on the line 3—3 of Figure 1.

Referring to the drawings in detail wherein like characters of reference denote corresponding parts, the reference character 10 indicates the frame of the device which includes a yoke 11 having spaced side arms 12. Secured to the side arms of the frame are opposed angle bars 13. These bars are horizontally arranged and are adapted to engage the upper edges 14 of the case 15 of a storage battery. These angle irons 13 are arranged at a sufficient height to take care of batteries of the tallest size. In addition, the side arms 12 may be relatively adjusted so that the angle irons may be adjusted to engage batteries of different widths.

For the purpose of adjusting the side arms 12 there is provided a shaft 16. This shaft is swiveled in one of the arms 12 as shown at 17, and the other end of the shaft is threaded as indicated at 18 for engagement within the threaded opening provided in the other arm 12. A crank handle 19 is rigid with the shaft 16 so that by rotating the shaft in one direction, the side arms may be moved relatively inward, and by rotating the shaft in an opposite direction, these arms will be moved relatively outward.

Pivotally mounted within the top of the yoke 11 is an operating lever 20. For this purpose the yoke carries a depending eye 21 which carries a ring 22 and this ring receives the lever 20, an eye 23 providing a loose pivotal connection between the lever and ring. One end of the lever carries a hook 24 which is engaged by one of the links of a chain 25 and the lower end of this chain carries an insulating member 26 to which is connected a pair of flexible members 27. Hooks 28 are carried at the outer ends of these members 27 and are adapted for detachable engagement with the connectors 29 of the battery cells 30.

By arranging the parts as shown in the drawings, the lever may be rocked to pull the cells from the case, engagement of the angle irons 13 with the edges of the case acting to prevent upward movement of the latter. The invention provides sufficient leverage to readily pull the cells from the case with very little effort.

The invention is susceptible of various changes in its form, proportions and minor details of construction and the right is herein reserved to make such changes as properly fall within the scope of the appended claims.

Having described the invention what is claimed is:—

1. In a battery cell puller, a frame adapted to be positioned over a battery, means carried by the frame to engage and hold the case of the battery against upward movement, a support depending from the frame, an operating lever mounted in the depending support of the frame, and cell connector engaging elements operatively connected with the lever to pull the cells from the case when the lever is operated.

2. In a battery cell puller, a frame provided with side arms adapted to be positioned over a battery, means carried by the frame to hold the case of the battery against upward movement, a shaft having one end swiveled in one arm of the frame and the other end of the shaft threadedly engaging the other arm, an operating lever mounted in the frame above said shaft, and cell connector engaging elements operatively connected with the lever to pull the cells from the case when the lever is operated.

3. In a battery cell puller, a frame provided with a yoke adapted to be positioned over a battery, means carried by the frame to engage and hold the case of the battery against upward movement, a ring depending from the yoke of the frame, an operating lever pivotally connected to the ring, cell connector engaging elements, and flexible means connecting said elements and the operating lever to pull the cell from the case when the lever is operated.

4. In a battery cell puller, a frame including a vertically disposed yoke, means at opposite sides of the frame to engage and hold the case of the battery against upward movement, means to adjust the sides of the frame relatively to adjust the case engaging means to batteries of different sizes, a lever pivotally supported by the yoke, and cell connector engaging elements having a flexible connection with the lever to pull the cells from the case when the lever is operated.

In testimony whereof I affix my signature.

OLAF MYKLEBY.